Patented Aug. 24, 1954

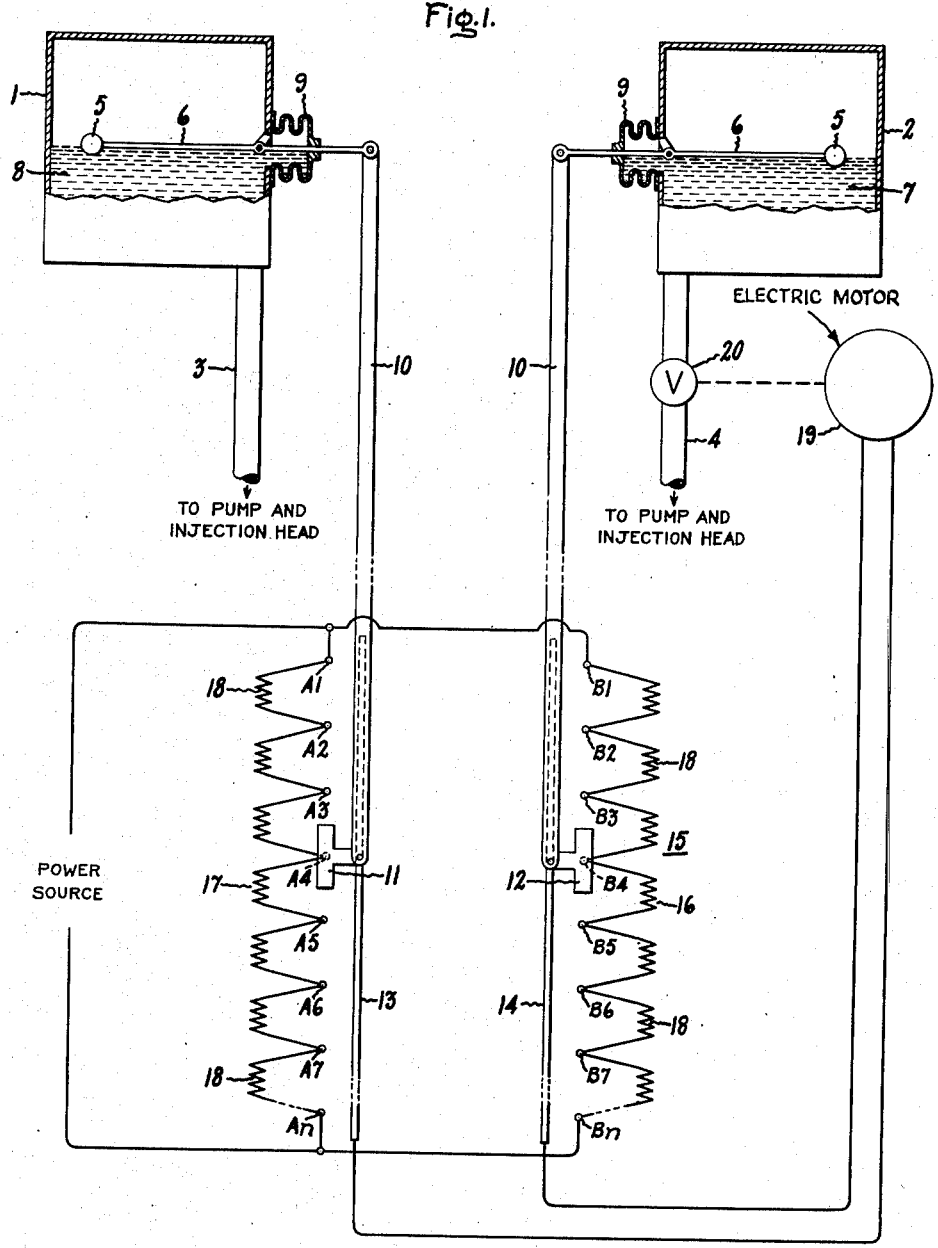

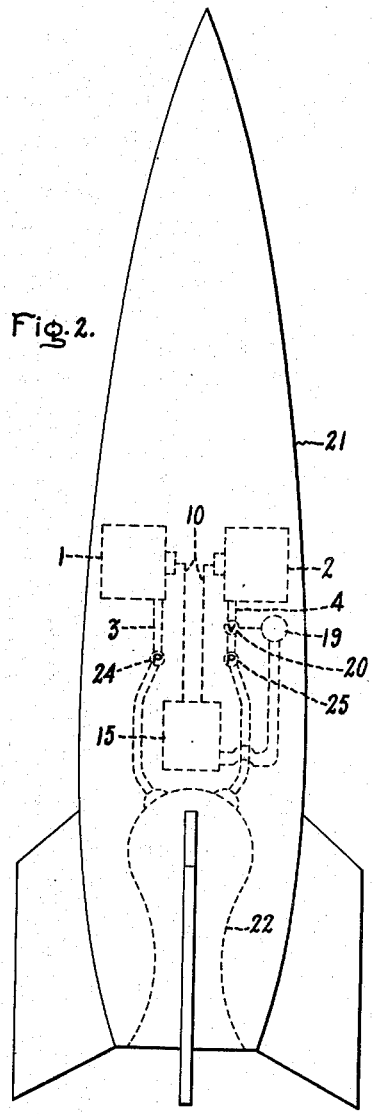

2,687,168

UNITED STATES PATENT OFFICE 2,687,168

ROCKET REACTANT FEED SYSTEM

Robert P. Haviland, Scotia, N. Y., assignor to General Electric Company, a corporation of New York Application November 22, 1950, Serial No. 197,050

3 Claims. (Cl. 158—36)

This invention relates to rockets. More particularly, it relates to means for maintaining the relative flow of liquid fuel and oxidizer reactants in a rocket.

A primary problem in the employment of rockets is to insure that the fuel and oxidizer reactants are exhausted at the same time since only by this method of operation may maximum performance be realized. This will be easily understood from a consideration of the basic formula $$V = C \log \frac{W_0}{W_f}$$

wherein V is the velocity, C is a constant, and $W_0$ and $W_f$ are the initial and final gross weights respectively of the rocket. While drag and gravity also have an influence on the velocity, they may be neglected here. It will be seen that in order to achieve the maximum possible velocity, $W_f$ should be as small as possible, or ideally the weight of the rocket structure itself less all reactants should be minimum, $W_0$ being the weight of the rocket structure plus the reactants. If then any portion of one of the reactants is exhausted before the other, leaving the latter unreacted, the final velocity is reduced. For example, in one specific rocket design, it was found that if one per cent of either of the reactants is left unreacted in the rocket, the final velocity due to the combustion process is reduced by about ten per cent. The range of the rocket is even more drastically affected, being reduced by about twenty per cent. Since a primary aim in rocketry is to attain high velocities and long ranges, the importance of exhausting both fuel and oxidizer reactants at the same instant will be at once apparent.

Heretofore, various solutions to this problem have been attempted. In one instance a test run is made of the rocket system to determine the relative rates of flow of the reactants and any tendency to vary from the proportional flow desired. Once the flow tendencies of the fuel and oxidizer systems are determined, compensations such as changes in feed pressures or pumping capacity are made to at least theoretically cause the fuel and oxidizer to exhaust at one and the same moment. In actual practice, it has been found that ground test runs with the fuel not burning are not adequate to determine the behavior of the reactant flow under actual flight conditions, and that no matter how carefully the tests are carried out, detrimental variations in fuel or oxidizer flow occur in flight. The net result is exhaustion of one reactant before the other and an attendant loss in velocity and range.

It is an object of the present invention to provide means for constantly maintaining the relative reactant flow rates in a rocket.

Another object of this invention is to provide means for adjusting the ratio between fuel and oxidizer reactant flow rates.

A further object of the invention is to provide means for reacting all of the fuel and oxidizer reactants of a rocket system.

A still further object of the present invention is to provide means for insuring that the fuel and oxidizer reactants of a rocket system are exhausted at the same time.

Other objects will become apparent from a consideration of the following description and the drawing in which Fig. 1 shows the present means for adjusting the relative flow of fuel and oxidizer reactants and Fig. 2 shows conventionally a rocket in which the present system may be used.

It has been found that means for accomplishing the above objects may be very easily provided.

More particularly, it has been found that reactant flow ratio adjustment may be provided by a combination of level floats in the reactant tanks which actuate an electrical resistance bridge control system.

Specifically, it has been found that reactant flow ratio adjustment and the co-exhaustion of the reactants may be realized by the use of reactant tank level floats connected through an electrical resistance bridge system to valve adjusting means in one of the reactant feed lines.

For a more complete understanding of the invention, reference is made to the drawing. In Fig. 1 there is shown in detail a portion of the reactant supply system and so much of the reactant flow rate adjuster system as is necessary for the practice of the present invention. Included in the reactant supply system are an oxidizer tank 1 and a fuel tank 2 which may be of any conventional shape. Tank 1 has an outlet conduit 3, and tank 2 an outlet conduit 4, the conduits leading to reactant pumps (not shown) which force the liquid reactants to the rocket motor injection head. While the flow is here described as being maintained by pumps, it will be realized that the tanks themselves may be pressurized as an alternate means of feeding the reactants. The various means of pressurizing such tanks are well known to those versed in the art. Mounted in each reactant tank is a float 5 attached to rod 6 which passes through the wall of the tank in a pivoted manner. As the level of the fuel 7 and oxidizer 8 in the tanks changes, the floats follow the level causing the outer ends of rods 6 to move vertically. In order to provide a leakproof seal at the point of passage of rods 6 through the tanks, arrangements such as bellows 9 are employed which will allow the desired motion of rods 6 and provide a tight tank wall seal. Other means such as an O-ring arrangement etc. may also be used in this connection. Rods 10 are linked pivotally to the outer ends of rods 6 for vertical motion as the latter change position. The lower ends of rods 10 terminate, one in movable electrical contact 11 and the other in movable electrical contact 12. These contacts are slidably mounted on guide rails 13 and 14 and are further pivoted at their point of connection with rods 10 so that they may move in a truly vertical path as rods 10 move up or down in response to the movement of rods 6 and floats 5 as the levels of fuel 7 or oxidizer 8 change. Rails or guides 13 and 14 are so positioned that as contacts 11 and 12 move vertically, the latter contact respectively fixed contacts A1 through $A_n$ and contacts B1 through $B_n$ of an electrical resistance bridge system 15, shown greatly enlarged. The arms or legs 16 and 17 of this bridge, which are connected in parallel, comprise a plurality of similar resistances 18 which are spaced or serially connected by contacts B1 through $B_n$ and A1 through $A_n$ respectively as shown. Bridge 15 is energized by a suitable power source. Movable contacts 11 and 12 are further connected through rails 13 and 14 directly to an electric motor 19 which immediately operates valve 20 in the fuel feed conduit 4 in response to a signal from bridge 15.

In operation, if the level, and hence floats 5, in both fuel and oxidizer tanks drop at the same rate so that the two levels are always at the same height, the downward equal motions of floats 5 are mechanically transmitted through rods 6 and 9 to slidably movable contacts 11 and 12 so that the latter are always in engagement with corresponding contacts in the arms of bridge 15. Since the bridge circuit is balanced under such conditions, there is no output signal to the electric motor. However, a different sequence of events occurs if the level in one reactant tank, for example tank 2, drops faster than in the other tank. In such case contact 12 rises faster than contact 11. Hence, at any one moment when contact 11 is, for example, in engagement with contact A4, contact 12 might be in engagement with contact B3. Since bridge system 15, which is shown greatly enlarged, is now unbalanced because of the variance in resistance in its two arms 16 and 17, an output signal is relayed directly to electric motor 19 which then immediately operates partially to close valve 20, lessening the flow of fuel through conduit 4. This brings the level of the fuel in line with that of the oxidizer so that the same relative amounts remain in the tanks. On the other hand, should the level of the oxidizer fall below that of the fuel, contact 11 will rise faster than contact 12 whereupon the output signal will actuate the electric motor to open valve 12 to bring the levels again in line. This mode of operation continues and insures that both tanks are exhausted simultaneously.

Any number of contacts A and B in any desired spacing may be used depending upon the fineness of the adjustment desired and the travel of contacts 11 and 12. It will be noted that contacts 11 and 12 are of the make before break type.

In any case, if the initial correction is too small, additional correction will automatically be made. Likewise, a reverse correction will be made if the first correction is too large. Any correction made is proportional to the error.

While tanks 1 and 2 are shown as being of the same size and having equal amounts of fuel and oxidizer, it will be realized that this is not necessarily the case. More or less amounts of oxidizer with respect to the fuel may be used depending upon the quantity of particular oxidizer required to oxidize or burn the specific fuel. Thus, where one reactant is consumed in the oxidation process more rapidly than the other, the proper relative ratio between the quantities of reactants may be constantly maintained, for example, by changing the length of rod 10 and the distance between the corresponding fixed contacts or by variation of the value of the resistances A1 . . . $A_n$, B1 . . . $B_n$, etc. Likewise, differences in tank sizes, as well as levels, may be accommodated. It will also be realized that the valve 20 may be placed in oxidizer line 3 or valves used in both lines 3 and 4.

Shown schematically in Fig. 2 is a rocket depicting the elements of the present invention in a conventional manner. Mounted within the rocket hull 21 are oxidizer tank 1 and fuel tank 2 along with oxidizer line 3 and fuel line 4 leading to rocket motor 23. Pumps 24 and 25 are utilized respectively to pump the oxidizer and fuel. Connected to the tank float systems, as best shown in Fig. 1, are rods 10 linked to the ratio adjuster 15 which also is shown in detail in Fig. 1. Signals from ratio adjustor 15 are relayed to electric motor which immediately or instantaneously operates valve 20 in accordance with the signal received.

It will be seen that by the present invention there is presented means whereby the relative levels or amounts of reactants in rocket fuel tanks may be maintained constant and whereby the fuel and oxidizer reactants may be exhausted at the same instant. By insuring that both reactant tanks are emptied at the same time, the velocity attained by the missile is increased as well as the range. As pointed out above, if either fuel or oxidizer remains in the rocket after the other reactant has been exhausted, the possible velocity and the range are decreased. These reductions are substantial in any case and particularly so in rocketry where the greatest possible velocity and range are desired. By the use of the present invention the maximum velocity and range for a given weight of reactant are realized without fail insofar as co-exhaustion of the reactants is concerned.

What I claim as new and desire to secure by Letters Patent of the United States is:

1. In a rocket having a hull and within said hull reservoirs for liquid fuel and oxidizer reactants and a rocket motor, conduits leading from said reservoirs to the rocket motor, and pumps in series with said conduits for pumping said reactants from said reservoirs to said rocket motor for reaction therein, means for adjusting the flow of said reactants comprising liquid level responsive means, an electrical bridge, an electric motor, valve means in the conduit from one reactant reservoir to said rocket motor, said electrical bridge having two similar resistance arms, connected in parallel and adapted to be connected to a source of power one for each reactant reservoir, each arm comprising a plurality of similar resistances serially connected by fixed contacts, a slidably movable contact for each arm respectively adapted to engage the fixed contacts of said bridge, said movable contact being mechanically linked to said liquid level responsive means in the corresponding reservoir, said movable contacts being connected directly to said electric motor which operates said valve, said bridge being so arranged that when the liquid level in one reservoir is the same as that in the other, the bridge is in balance and no signal is relayed to the electric motor, and further so arranged that when the liquid level in one reservoir is below that of the other reservoir, the bridge is unbalanced, relaying a signal to the electric motor which immediately operates said valve to bring the reservoir levels in line.

2. In a rocket having a hull and within said hull reservoirs for liquid fuel and oxidizer reactants and a rocket motor, conduits leading from said reservoirs to the rocket motor, and pumps in series with said conduits for pumping said reactants from said reservoirs to said rocket motor for reaction therein, means for exhausting the liquid fuel and oxidizer reactants simultaneously, said means comprising a level float in each reactant reservoir mechanically linked through a movable electrical contact to one arm of an electrical resistance bridge having two similar arms, one for each reactant reservoir, said arms being connected in parallel and adapted to be connected to a source of power, each arm comprising a plurality of similar resistances serially connected by fixed contacts whereby as the level float in each tank moves vertically, the resistance balance in each arm of said bridge is changed correspondingly, an electric motor directly connected to said movable contacts to receive the output signal of said bridge, and valve means connected to said electric motor to instantaneously increase the rate of flow from one of said reservoirs in response to a signal from said electrical bridge when the liquid level of said reservoir is above the liquid level of the other reservoir and decrease the rate of flow from its associated reservoir when the liquid level of said reservoir is below the liquid level of the other reservoir.

3. In a rocket having a hull and within said hull tanks for liquid fuel and oxidizer reactants and a rocket motor, conduits leading from said tanks to the rocket motor, and pumps in series with said conduits for pumping said reactants from said tanks to said rocket motor for reaction therein, means for maintaining the relative flow of fuel and oxidizer reactants, said means comprising a level float in each reactant tank mechanically linked to a movable electrical contact which moves in unison with changes in position of said level float, an electrical resistance bridge system having two arms connected in parallel and adapted to be connected to a source of power, each arm comprising similar resistances serially connected by fixed contacts, the resistances and fixed contacts in the two arms being juxtaposed, the fixed contacts of said arms being adapted to be engaged by the corresponding movable electrical contact, an electric motor connected to said movable contacts adapted to receive directly electrical output signals from said bridge system and a valve in the fuel feed line adapted to be operated instantaneously by said electric motor, increasing the rate of flow from the fuel tank when the liquid level in said tank is above the liquid level of the oxidizer tank and decreasing the rate of flow from the fuel tank when the liquid level of said fuel tank is below the liquid level of the oxidizer tank in response to the relative position of the level floats in each tank.

References Cited in the file of this patent

UNITED STATES PATENTS

| Number | Name | Date |
| --- | --- | --- |
| 1,767,588 | Hutton | June 24, 1930 |
| 2,509,629 | De Giers et al. | May 30, 1950 |